(12) United States Patent
Traupman et al.

(10) Patent No.: US 8,930,301 B2
(45) Date of Patent: Jan. 6, 2015

(54) SYSTEMS AND METHODS FOR CONTENT RESPONSE PREDICTION

(71) Applicant: LinkedIn Corporation, Mountain View, CA (US)

(72) Inventors: Jonathan David Traupman, Oakland, CA (US); Deepak Agarwal, Sunnyvale, CA (US); Liang Zhang, Fremont, CA (US); Bo Long, Palo Alto, CA (US); Frank Emmanuel Astier, Mountain View, CA (US)

(73) Assignee: LinkedIn Corporation, Mountain View, CA (US)

( * ) Notice: Subject to any disclaimer, the term of this patent is extended or adjusted under 35 U.S.C. 154(b) by 0 days.

(21) Appl. No.: 13/906,874

(22) Filed: May 31, 2013

(65) Prior Publication Data

US 2014/0358826 A1 Dec. 4, 2014

(51) Int. Cl.
- G06N 5/02 (2006.01)
- G06N 5/04 (2006.01)
- G06N 99/00 (2010.01)

(52) U.S. Cl.
CPC ............... *G06N 5/04* (2013.01); *G06N 99/005* (2013.01)
USPC .......................................................... 706/59

(58) Field of Classification Search
None
See application file for complete search history.

(56) References Cited

PUBLICATIONS

Davison, Brian D.; "Predicting Web Actions from HTML Content"; 2002; ACM; pp. 159-168.*
Zhang, Yi et al.; "Efficient Bayesian Heirarchical User Modeling for Recommendation Systems"; 2007; ACM; pp. 47-54.*
Enders, Abrecht et al.; "The long tail of social networking. Revenue models of social networking sites"; Elsevier; pp. 199-211.*
Ricco, Francesco et al.; "Recommender Systems Handbook"; 2010; Springer; 847 pages.*
Ritthoff, Oliver et al.; "YALE: Yet Another Learning Environment"; 2001; LLWA 01—Tagungsband der GI-Workshop-Woche; 9 pages.*
Fischer, Simon et al.; "YALE: Yet Another Learning Environment"; 2002; No. CI-136/02, Collaborative Research Center 531; 98 pages.*
Mierswa, Ingo et al.; "A Flexible Platform for Knowledge Discovery Experiments: YALE—Yet Anothe Learning Environment"; Proc. of LLWA, vol. 2003; 2 pages.*

* cited by examiner

*Primary Examiner* — Stanley K Hill
(74) *Attorney, Agent, or Firm* — Schwegman Lundberg & Woessner, P.A.

(57) ABSTRACT

Techniques for predicting a user response to content are described. According to various embodiments, a configuration file is accessed, where the configuration file includes a user-specification of raw data accessible via external data sources and raw data encoding rules. In some embodiments, the raw data includes raw member data associated with a particular member and raw content data associated with a particular content item. Thereafter, source modules encode the raw data from the external data sources into feature vectors, based on the raw data encoding rules. An assembler module assembles one or more of the feature vectors into an assembled feature vector, based on user-specified assembly rules included in the configuration file. A prediction module performs a prediction modeling process based on the assembled feature vector and a prediction model, to predict a likelihood of the particular member performing a particular user action on the particular content item.

20 Claims, 12 Drawing Sheets

SYSTEMS AND METHODS FOR CONTENT RESPONSE PREDICTION

TECHNICAL FIELD

The present application relates generally to data processing systems and, in one specific example, to techniques for predicting a user response to content.

BACKGROUND

Social network services such as LinkedIn® may include various webpages, including a homepage of the social network service, profile pages of various members of the social network service, group pages of various groups associated with the social network service, and so on. Each of these webpages may include various types of content items, such as advertisements, articles, features, and content feeds.

BRIEF DESCRIPTION OF THE DRAWINGS

Some embodiments are illustrated by way of example and not limitation in the figures of the accompanying drawings in which.

DETAILED DESCRIPTION

Figure 1:
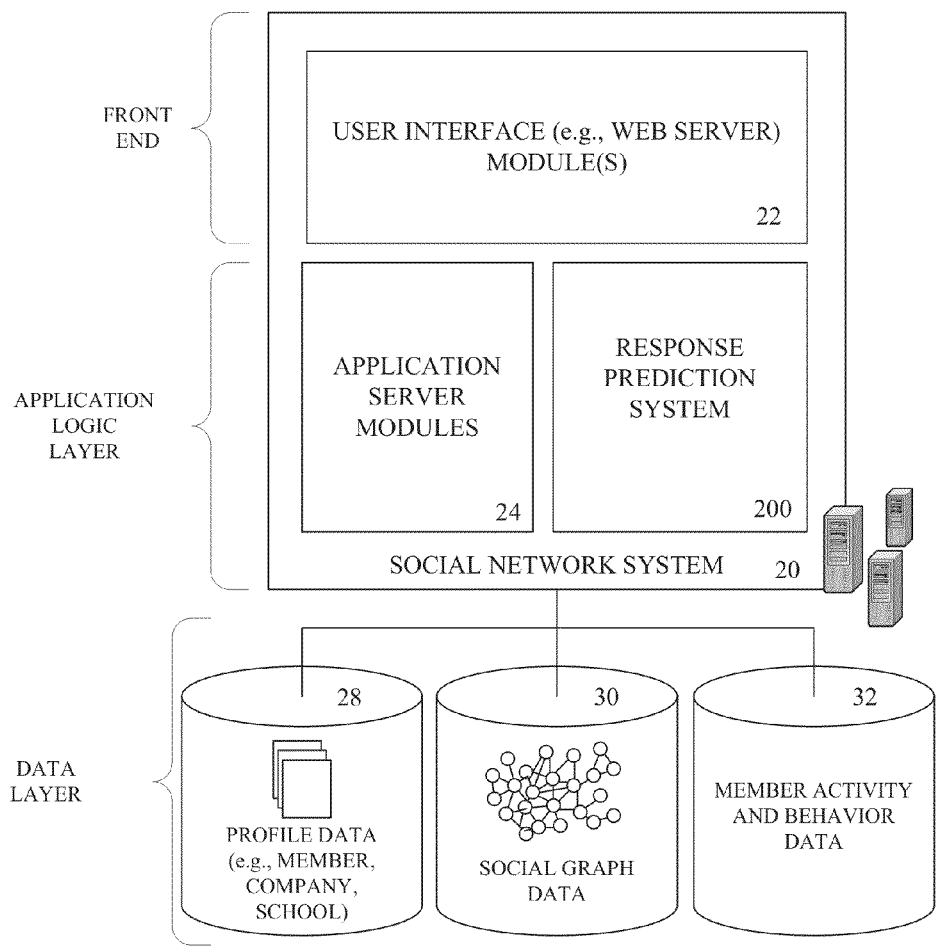
FIG. 1 is a block diagram showing the functional components of a social networking service, consistent with some embodiments of the invention.

Example methods and systems for predicting a user response to content are described. In the following description, for purposes of explanation, numerous specific details are set forth in order to provide a thorough understanding of example embodiments. It will be evident, however, to one skilled in the art that the present invention may be practiced without these specific details.

According to various exemplary embodiments described herein, a response prediction system is configured to predict the likelihood of a user performing an action on a particular content item. For example, the response prediction system may predict the likelihood that a particular member of a social network service (e.g., LinkedIn®) will click on a particular advertisement or content feed item displayed on a webpage of the social network service.

The response prediction system may include various types of component modules including sources that encode raw data from external data sources into feature vectors, transformers that modify the feature vectors, and an assembler that gathers and packages the feature vectors. In some embodiments, the assembled feature vector output by the assembler may include various features describing a particular member, a particular content item and a particular context. The assembled feature vector may then be passed to a prediction module for predicting whether the particular member will click on the particular content item given the particular context. The prediction module may use any one of various known prediction modeling techniques to perform the prediction modeling. For example, the prediction module may apply a statistics-based machine learning model such as a logistic regression model to the features in the assembled feature vector. Accordingly, the response prediction system of this disclosure provides a user with tools to generate an assembled feature vector that may be passed to a prediction model.

As described in various embodiments, the response prediction system may be a configuration-driven system for building, training, and deploying prediction models for making predictions. In particular, the operation of the prediction modeling system is completely configurable and customizable by a user through a user-supplied configuration file such as a JavaScript Object Notation (JSON), eXtensible Markup Language (XML) file, etc. For example, each module in the response prediction system may have text associated with it in the configuration file that describes how the module is configured, the inputs to the module, the operations to be performed by the module on the inputs, the outputs from the module, and so on. Accordingly, the user may rearrange the way these modules are connected together as well as the rules that the various modules use to perform various operations. Thus, whereas conventional prediction modeling is often performed in a fairly ad hoc and code driven manner, the modules of the response prediction may be configured in a modular and reusable fashion, to enable more efficient prediction modeling.

FIG. 1 is a block diagram illustrating various components or functional modules of a social network service such as the social network system 20, consistent with some embodiments. As shown in FIG. 1, the front end consists of a user interface module (e.g., a web server) 22, which receives requests from various client-computing devices and communicates appropriate responses to the requesting client devices. For example, the user interface module(s) 22 may receive requests in the form of Hypertext Transport Protocol (HTTP) requests, or other web-based, application programming interface (API) requests. The application logic layer includes various application server modules 14, which, in conjunction with the user interface module(s) 22, generate various user interfaces (e.g., web pages) with data retrieved from various data sources in the data layer. With some embodiments, individual application server modules 24 are used to implement the functionality associated with various services and features of the social network service. For instance, the ability of an organization to establish a presence in the social graph of the social network service, including the ability to establish a customized web page on behalf of an organization, and to publish messages or status updates on behalf of an organization server modules 24. Similarly, a variety of other applications or services that are made available to members of the social network service will be embodied in their own application server modules 24.

As shown in FIG. 1, the data layer includes several databases, such as a database 28 for storing profile data, including both member profile data as well as profile data for various organizations. Consistent with some embodiments, when a person initially registers to become a member of the social network service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database with reference number 28. Similarly, when a representative of an organization initially registers the organization with the social network service, the representative may be prompted to provide certain information about the organization. This information may be stored, for example, in the database with reference number 28, or another database (not shown). With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources and made part of a company's profile.

Once registered, a member may invite other members, or be invited by other members, to connect via the social network service. A "connection" may require a bilateral agreement by the members, such that both members acknowledge the establishment of the connection. Similarly, with some embodiments, a member may elect to "follow" another member. In contrast to establishing a connection, the concept of "following" another member typically is a unilateral operation and, at least with some embodiments, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, are stored and maintained within the social graph, shown in FIG. 1 with reference number 30.

The social network service may provide a broad range of other applications and services that allow members the opportunity to share and receive information, often customized to the interests of the member. For example, with some embodiments, the social network service may include a photo sharing application that allows members to upload and share photos with other members. With some embodiments, members may be able to self-organize into groups, or interest groups, organized around a subject matter or topic of interest. With some embodiments, the social network service may host various job listings providing details of job openings with various organizations.

As members interact with the various applications, services and content made available via the social network service, the members' behaviour (e.g., content viewed, links or member-interest buttons selected, etc.) may be monitored and information concerning the member's activities and behaviour may be stored, for example, as indicated in FIG. 1 by the database with reference number 32. This information may be used to classify the member as being in various categories. For example, if the member performs frequent searches of job listings, thereby exhibiting behaviour indicating that the member is a likely job seeker, this information can be used to classify the member as a job seeker. This classification can then be used as a member profile attribute for purposes of enabling others to target the member for receiving messages or status updates. Accordingly, a company that has available job openings can publish a message that is specifically directed to certain members of the social network service who are job seekers, and thus, more likely to be receptive to recruiting efforts. With some embodiments, the social network system 20 includes what is generally referred to herein a response prediction system 200. The response prediction system 200 is described in more detail below in conjunction with FIG. 2.

Although not shown, with some embodiments, the social network system 20 provides an application programming interface (API) module via which third-party applications can access various services and data provided by the social network service. For example, using an API, a third-party application may provide a user interface and logic that enables an authorized representative of an organization to publish messages from a third-party application to a content hosting platform of the social network service that facilitates presentation of activity or content streams maintained and presented by the social network service. Such third-party applications may be browser-based applications, or may be operating system-specific. In particular, some third-party applications may reside and execute on one or more mobile devices (e.g., phone, or tablet computing devices) having a mobile operating system.

Figure 2:
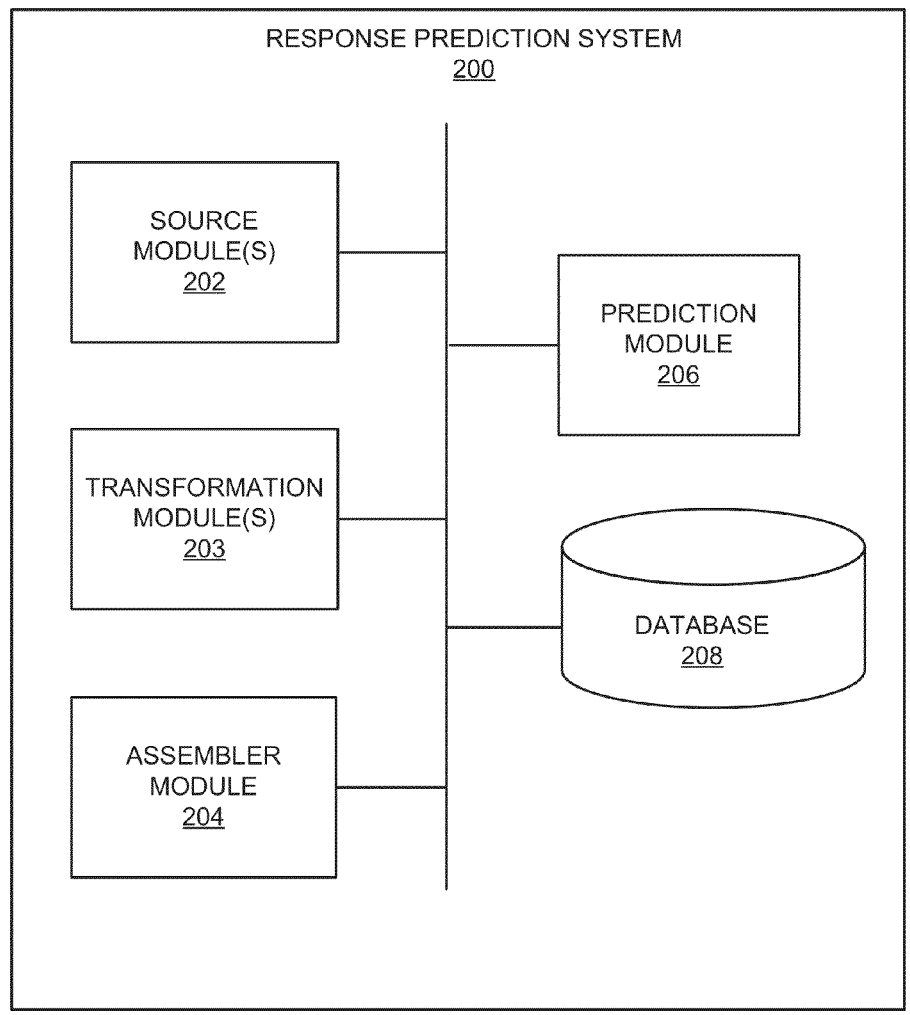
FIG. 2 is a block diagram of an example system, according to various embodiments.

Turning now to FIG. 2, a response prediction system 200 includes one or more source modules 202, one or more transformation modules 203, an assembler module 204, a prediction module 206, and a database 208. The modules of the response prediction system 200 may be implemented on or executed by a single device such as a response prediction device, or on separate devices interconnected via a network. The aforementioned response prediction device may be, for example, a client machine or application server.

Figure 3:
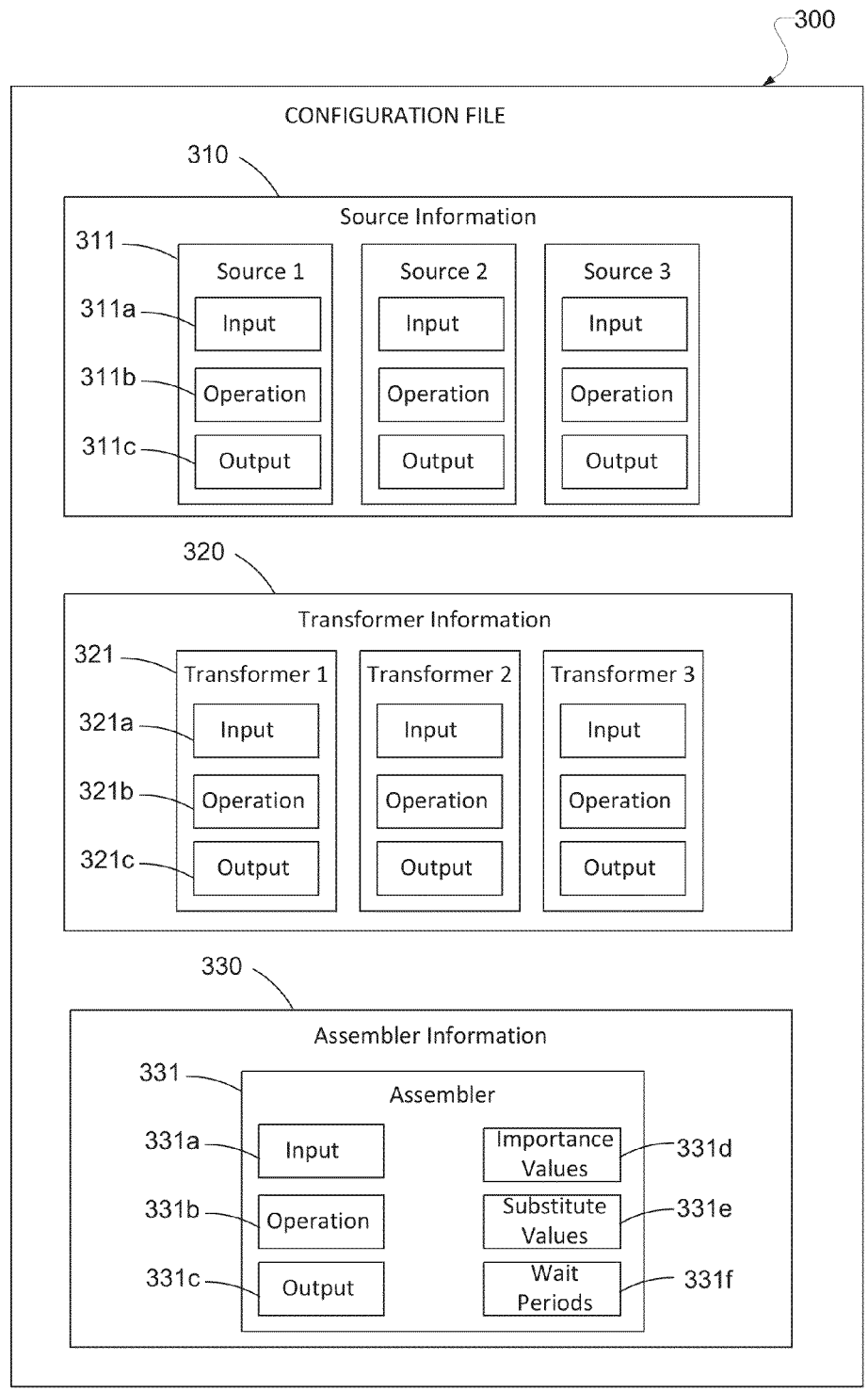
FIG. 3 illustrates an exemplary configuration file, according to various embodiments.

According to various exemplary embodiments described below, the operation of the response prediction system 200 and each of the modules therein may be controlled by a user specified configuration file. The configuration file may be stored locally at, for example, the database 208 illustrated in FIG. 2, or may be stored remotely at a database, data repository, storage server, etc., that is accessible by the response prediction system 200 via a network (e.g., the Internet). The configuration file may be any type of electronic file or document written in any type of computer programming language, such as an electronic file written in JavaScript Object Notation (JSON) or eXtensible Markup Language (XML). The configuration file may include at least information (e.g., instructions or code) describing the configuration and operation of each of the source modules 202, each of the transformation modules 203, and the assembler module 204. All of the information in the configuration file is editable by a user based on the user's present needs and requirements, and accordingly, the operation of the response prediction system 200 is entirely customizable and configurable by the user. An abstract representation of an exemplary configuration file 300 is illustrated in FIG. 3. The configuration file 300 includes source information 310 associated with various source modules, transformer information 320 associated with various transformation modules, and assembler information 330 associated with an assembler module. Aspects of the configuration file 300 will be described in more detail below.

Figure 4:
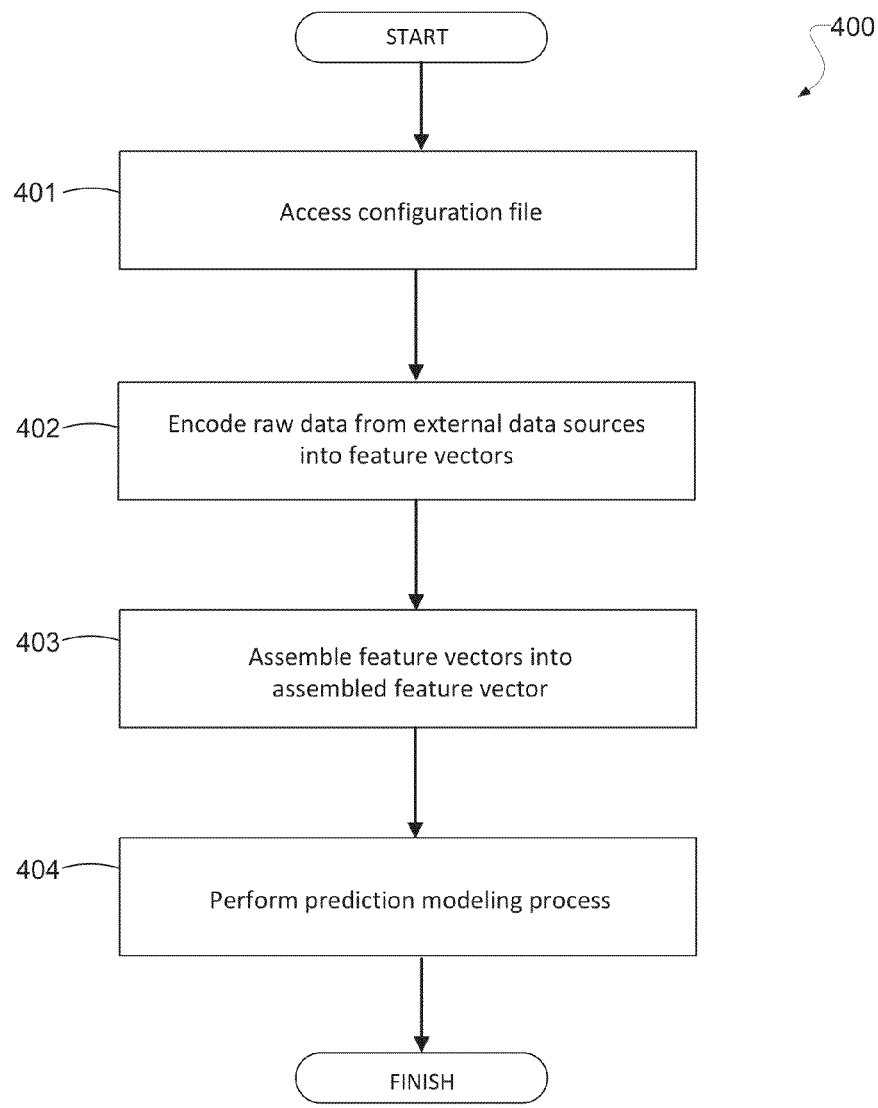
FIG. 4 is a flowchart illustrating an example method, according to various embodiments.

FIG. 4 is a flowchart illustrating an example method 400, according to various exemplary embodiments. The method 400 may be performed at least in part by, for example, the response prediction system 200 illustrated in FIG. 2 (or an apparatus having similar modules). Operations 401-404 in the method 400 will now be described briefly. In operation 401, the source modules 202 access a configuration file that identifies raw data accessible via external data sources. In some embodiments, the raw data may be raw member data associated with a particular member or raw content data associated with a particular content item. In operation 402, the source modules 202 encode the raw data from the external data sources into feature vectors, based on raw data encoding rules included in the configuration file. In operation 403, the assembler module 204 assembles one or more of the feature vectors into an assembled feature vector. The assembler module 204 may generate the assembled feature vector based on user-specified assembly rules included in the configuration file. Finally, in operation 404, the prediction module 206 performs a prediction modeling process based on the assembled feature vector and a prediction model to predict a likelihood of a particular member (e.g., the member described in the raw member data) performing a particular user action on a particular content item (e.g., the content item described by the raw content data). The prediction module 206 may use any one of various known prediction modeling techniques to perform the prediction modeling. For example, the prediction module 206 may apply a statistics-based machine learning model such as a logistic regression model to the assembled feature vector. Each of the aforementioned operations 401-404, and each of the aforementioned modules of the response prediction system 200, will now be described in greater detail.

Referring back to FIG. 4, in operation 401, the source modules 202 access a configuration file that identifies raw data that is located at external data sources and/or is accessible via external data sources. For example, with reference to the configuration file 300 illustrated in FIG. 3, the source information 310 includes source information 311 for a first source module ("Source 1"), where the source information 311 includes input information 311a describing inputs to the source module, operation information 311b describing the operations to be performed by the source module on the inputs, and output information 311c describing the format and content of the output of the source module and where the output is to be stored. Similarly, the source information 310 also includes source information associated with a second source module ("Source 2") and source information associated with a third source module ("Source 3").

Accordingly, in the configuration file 300 illustrated in FIG. 3, the input information (e.g., 311a) for each of the source modules may identify various external data sources, and identify various types of raw data located at (or accessible via) each of these external data sources. In some embodiments, the external data sources identified in the configuration file 300 may correspond to remote data storage facilities, data repositories, Web servers, etc., that are accessible by the source modules 202 via a network (e.g., the Internet). In some embodiments, the raw data identified in the configuration file 300 may be electronic data (such as an electronic file or a specific portion thereof) stored in one of the aforementioned remote data storage facilities, data repositories, Web servers, etc. Accordingly, after accessing the configuration file 300, each of the source modules 202 may proceed to retrieve the raw features from the external data sources, based on the instructions in the configuration file 300.

Figure 5:
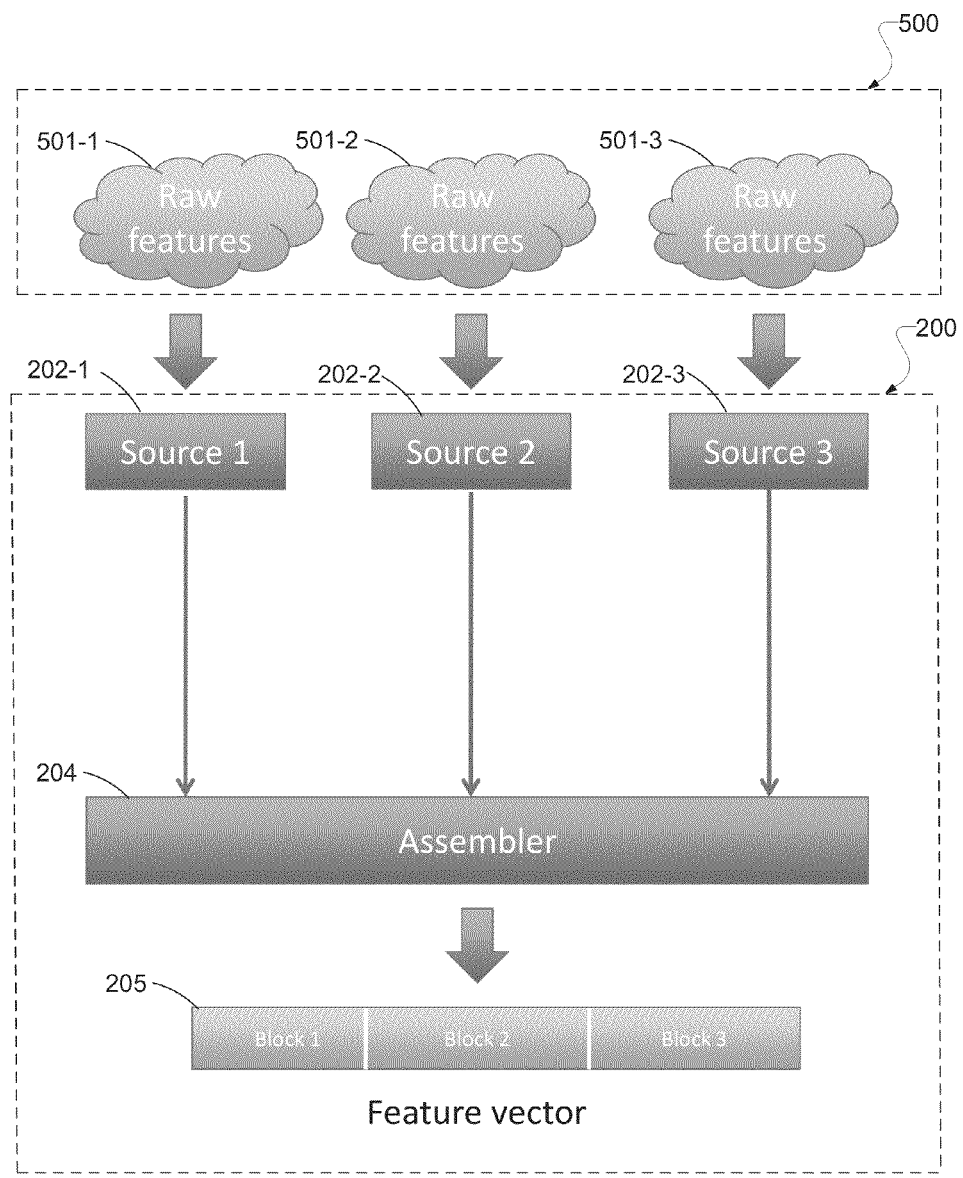
FIG. 5 illustrates a schematic diagram of an exemplary data flow in a response prediction system, according to various embodiments.

For example, FIG. 5 illustrates a schematic view of a data flow with regards to portions of the response prediction system 200. As illustrated in FIG. 5, raw features 501 (also referred to as raw data or raw external data) may be located at external data source(s) 500 outside the response prediction system 200. The response prediction system 200 may include multiple source modules 202, where each of the source modules 202 may be associated with a particular external source and/or a particular set of raw feature data accessible via each external data source. For example, source module 202-1 may be associated with the raw features 501-1, whereas source module 202-2 may be associated with the raw features 501-2, and so on. The association of source modules with the particular external data sources and/or raw features may be defined by user instructions in the configuration file 300. For example, in some embodiments, the configuration file 300 may include user instructions specifying that a particular source module is to access a particular piece of data (e.g., a data file or a specific portion of a data file) that is stored at a particular location corresponding to an external data source. Such instructions may be stored in, for example, the input information (e.g., 311a) of each of the source modules.

According to various embodiments, the raw features may be any type of information that may be used to predict the likelihood that a particular member will perform a particular user action on a particular content item, or, in one embodiment, the likelihood that a particular member of a social network service (e.g., LinkedIn.com) will click on an advertisement displayed on a webpage associated with the social network service.

In some embodiments, the raw features may include raw member data or raw member features describing a member. Examples of raw member data describing a member include gender, age, current location, previous locations, industry, education, alma mater, current job, current employer, previous jobs, previous employers, experience, skills, number of connections, identity of connections, networks, groups, interests, preferences, hobbies, purchase history, browsing history, ethnicity, sexual orientation, and so on. The raw member data may correspond to member profile data or member attributes associated with an account of the member on a social network service such as LinkedIn® or Facebook®. For example, the raw member data may correspond to the profile data, social graph data, and/or member activity and behaviour data stored in the databases 28, 30 and 32 of social network system 20 illustrated in FIG. 1. Accordingly, the external data source from which such raw member data may be accessed may be a database, data repository, storage facility, Web server, etc., associated with a social network service such as LinkedIn® or Facebook®. With reference to FIG. 5, the plurality of source modules 202 may include a member source module (e.g., source module 202-1) configured to access, retrieve, or receive the raw member data (e.g., features 501-1). For example, the configuration file 300 may include instructions such as: source module S is to access data portion D of file F located at storage location L associated with external data source DS. Such instructions may be stored in input information 311*a* of the appropriate source module (see FIG. 3). According to various exemplary embodiments, various raw member features may also be accessed from non-stored sources of member feature data. For example, member feature data may be included in information that comes into the system 200 dynamically with an incoming request (e.g., a request for an online inference received at runtime).

In some embodiments, the raw features may include raw content data or raw content features describing a content item such as an advertisement. Examples of raw content data describing an advertisement includes advertisement type, advertisement category, advertisement creator industry, advertisement campaign ID, advertisement title, advertisement keywords, advertisement targeting criteria, advertisement cost information, and so on. The raw content data may be stored in a content/advertisement server or similar storage facility (e.g., database, data repository, etc.) that stores information regarding various advertisements. Accordingly, the external data source from which such raw content data may be accessed may be a database, data repository, storage facility, Web server, etc., associated with the social network service such as LinkedIn® or Facebook®. With reference to FIG. 5, the plurality of source modules 202 may include a content source module (e.g., source module 202-2) configured to access, retrieve, or receive the raw content data (e.g., features 501-2).

According to various exemplary embodiments, the raw features may include raw context data or raw context features describing a potential or actual context in which a particular member may interact with a particular content item (such as an advertisement displayed on a webpage). Examples of raw context data include time, date, hour of day, day of week, hour of week, Internet Protocol (IP) address, current user geolocation information, content item position information (e.g., the position on a webpage of the content item, such as top, bottom, left, right, center, banner, etc.), content item host page information or channel ID (e.g., the backing page upon which the content item is displayed, such as a member profile page, homepage, content feed page, group page, etc., or the channel through which the content item is displayed, such as webpage, email, text, etc.), content item rendering information (e.g., various rendering characteristics of a content item with respect to the appearance of the content item, such as advertisement format, ad lot size/shape, advertisement image characteristics, advertisement color characteristics, advertisement title font size, advertisement title font type, advertisement keyword font size, advertisement keyword font type, etc.), browser data describing a browser utilized to render content (e.g., browser model, browser brand, browser capabilities, browser version, etc.), and so on. The raw context data may be stored in a context server or similar storage facility (e.g., database, data repository, etc.) that stores information regarding various contexts. For example, the raw context data may correspond to member interaction history or behaviour history associated with an account of the member on a social network service such as LinkedIn® or Facebook®. For example, the raw context data may correspond to the member activity and behaviour data stored in the database 32 of social network system 20 illustrated in FIG. 1. Accordingly, the external data source from which such raw context data may be accessed may be a database, data repository, storage facility, Web server, etc., associated with a social network service such as LinkedIn® or Facebook®. With reference to FIG. 5, the plurality of source modules 202 may include a context source module (e.g., source module 202-3) configured to access, retrieve, or receive the raw context data (e.g., features 501-3). According to various exemplary embodiments, various context features may be accessed from non-stored sources of context feature data, such as by acquiring real-time data (e.g., data that is not stored) describing various context features. For example, instead of retrieving the current time from a storage repository or "context server", a source module may acquire the current time directly off an incoming request (e.g., a request for an online inference received at runtime).

In some embodiments, the raw features may include raw impression data or raw impression features describing a number of impressions of a particular content item (such as an advertisement displayed on a webpage) by a particular member. Examples of raw impression data include number of impressions/views, number of impressions/views during a specific time interval (e.g., the last day, the last week, the last month), average impression frequency over a specific time interval, number of impressions/views given a certain context (e.g., time, date, hour of day, day of week, hour of week, content item page position information, content item host page information, content item rendering information, etc.), and so on. Thus, the impression features may include finely grained impression data, such as how many times a person reviewed an advertisement when it is displayed in a particular way or on a particular page, etc. The impression data/impression features may also include responses. For example, in some embodiments, what's relevant is not just whether a given user has seen a given piece of content before, but also whether and how the given user previously interacted with that piece of content (e.g. click/like/etc.) The raw impression data may be stored in an impression server or similar storage facility (e.g., database, data repository, etc.) that stores information regarding various impressions. For example, the raw impression data may correspond to the member activity and behaviour data stored in the database 32 of social network system 20 illustrated in FIG. 1. Accordingly, the external data source from which such raw impression data may be accessed may be a database, data repository, storage facility, Web server, etc., associated with a social network service such as LinkedIn® or Facebook®. The plurality of source modules 202 may include an impression source module configured to access, retrieve, or receive the raw impression data.

Referring back to the method 400 and FIG. 4, in operation 402, the source modules 202 encode the raw data from the external data sources into feature vectors based on raw data encoding rules. As understood by those skilled in pattern recognition and machine learning, a feature vector is an n-dimensional vector of numerical features that represent some object. According to various exemplary embodiments, the configuration file may include the user-specified raw data encoding rules that describe how each of the source modules 202 is to encode each of the raw features (from each of the external sources) into a feature vector. For example, in the configuration file 300 illustrated in FIG. 3, the operation information (e.g., 311*b*) for each of the source modules may include the user-specified raw data encoding rules. An example of a raw data encoding rule is: a particular member feature F located at storage location L of the external data source S is to be inserted into position X of a member feature vector M. Accordingly, with reference to FIG. 5, the configuration file 300 may specify how a member source module (e.g., source module 202-1) is to encode the raw member features (e.g., features 501-1) into a member feature vector, how a content source module (e.g., source module 202-2) is to encode the raw content features (e.g., features 501-2) into a content feature vector, and how a context source module (e.g., source module 202-3) is to encode the raw context features (e.g., features 501-3) into a context feature vector, and so on. Thus, the source modules 202 are configured to access the raw data encoding rules included in the configuration file 300, to access the raw external features from the external data sources, and to encode these raw external features into feature vectors based on the user-specified raw data encoding rules included in the configuration file 300.

Figure 6:
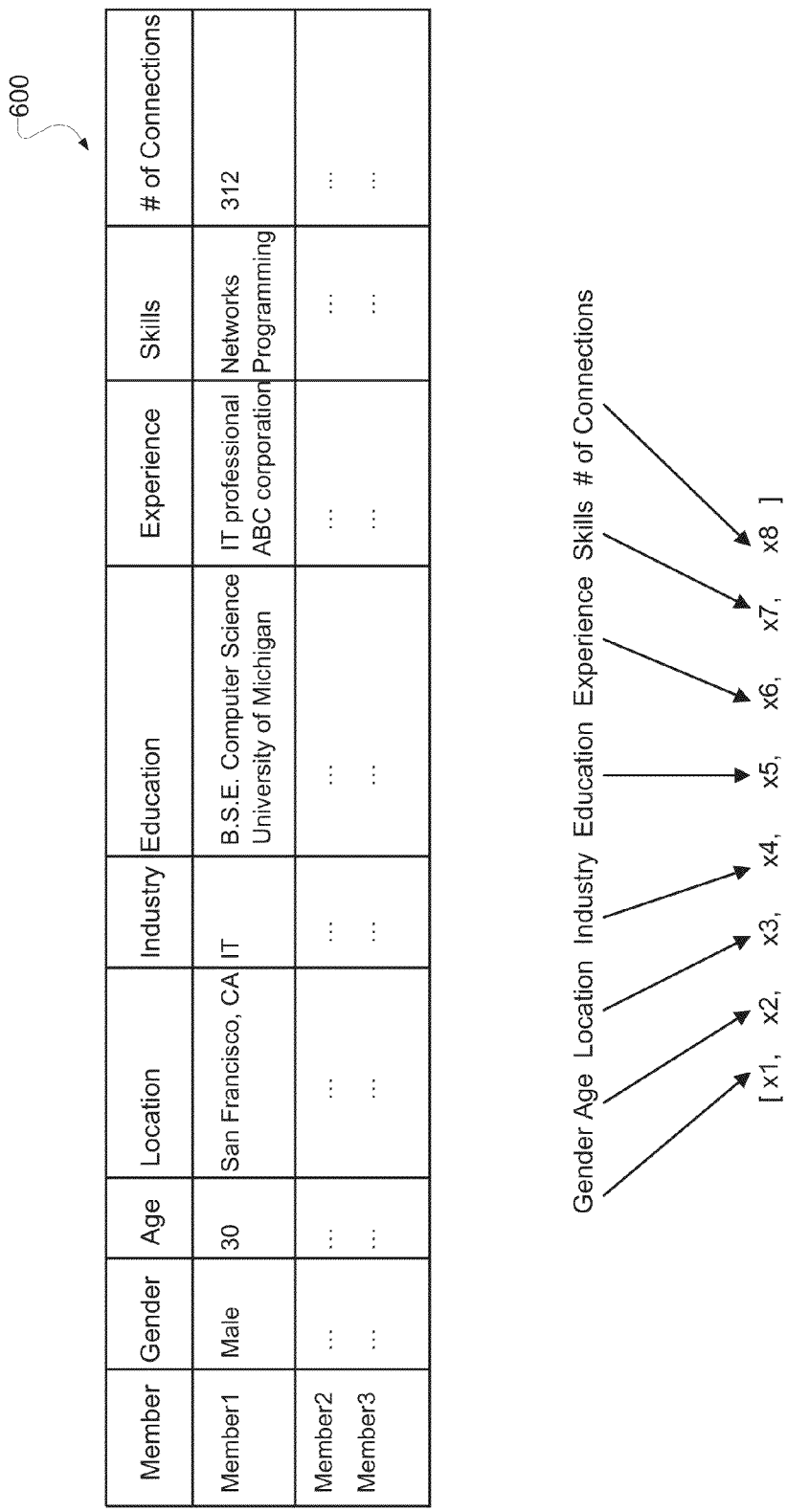
FIG. 6 illustrates an example of raw member data and a member feature vector, according to various embodiments.

FIG. 6 illustrates an example of raw member features stored in a database table 600 of an external data source, and an example of a member feature vector. The database table 600 identifies various members (e.g., member1, member2, member3, etc.) and, for each of the members, various member features (also known as member profile attributes), such as gender, age, location, industry, education, experience, skills, number of connections, and so on. As described above, a member source module may access member feature vector encoding rules in the configuration file 300 that state that, for example, a particular member feature F located at storage location L of the external data source S is to be inserted into position X of a member feature vector M. More specifically, with reference to FIG. 6, the member feature vector encoding rules may state that, for example, a member feature of gender is to be stored at a position X1 of a member feature vector, a member feature of age is to be stored a position X2 of the member feature vector, and so on. Thus, the resulting member feature vector includes various member features associated with a particular member.

The encoding process may involve converting the raw data into an internal representation for insertion into a feature vector, based on the feature vector encoding rules included in the configuration file 300. For example, the feature vector encoding rules may specify that a raw data feature having a string value should be converted to a numeric value for coding into a feature vector. For example, an occupation data feature may have a raw string value such as "engineer", "doctor", or "lawyer". Accordingly, the feature vector encoding rules may specify that the raw occupation feature data of "engineer" should be converted to a numeric feature having a value of 1, whereas the raw occupation feature data of "doctor" should be converted to a numeric feature having a value of 2, and the raw occupation feature data of "lawyer" should be converted to a numeric feature having a value of 3, and so on. According to various exemplary embodiments, source modules may be configured to encode non-numeric features using a binary format: e.g. "engineer" maps to a value of one in position P1, "doctor" a one in position P2, and "lawyer" a one in position P3. In such case, there may be a constraint that only one of {P1, P2, P3} will be one in a single vector (unless, for example, there is an individual who is simultaneously a doctor and a lawyer).

Figure 7:
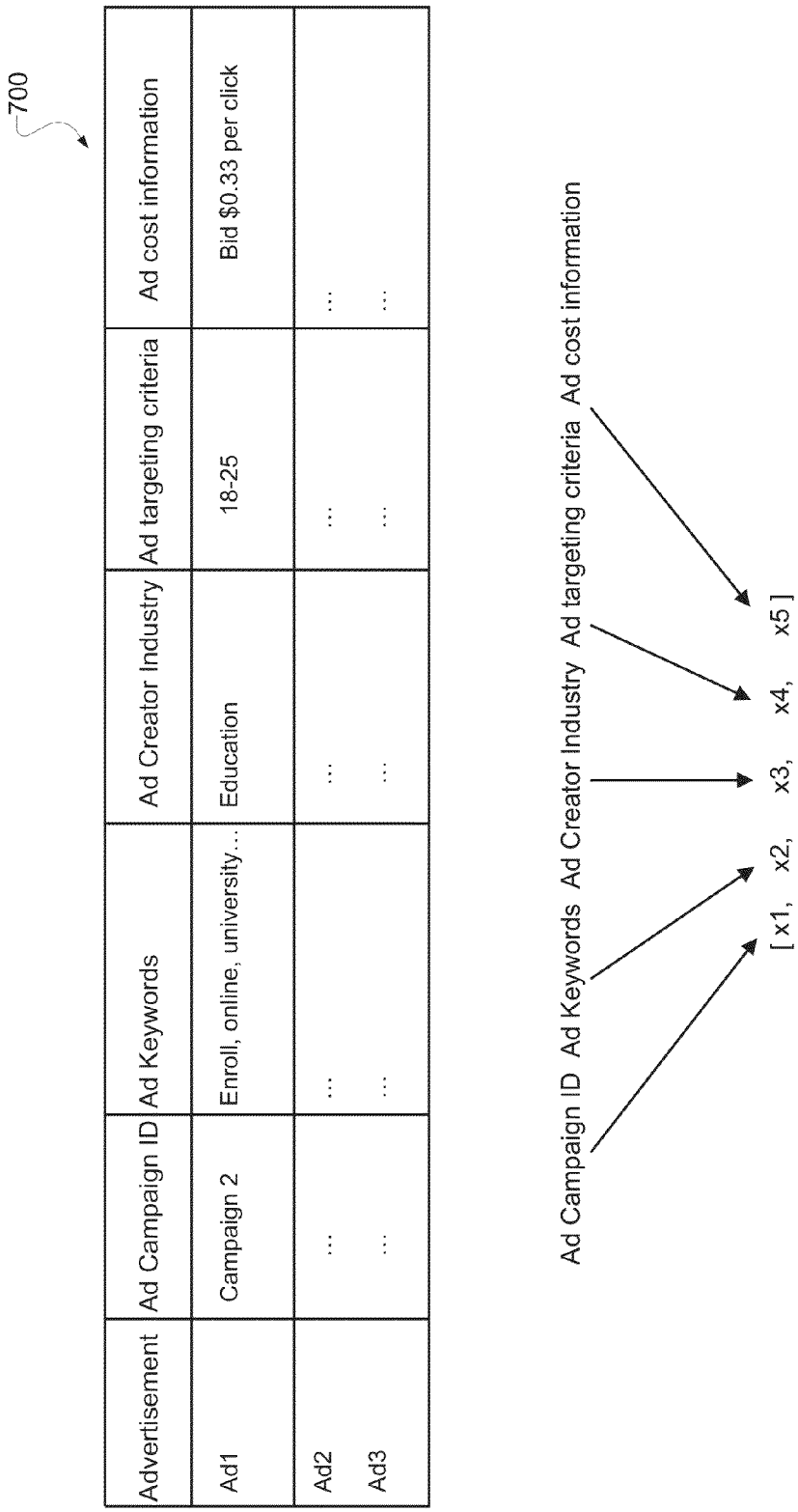
FIG. 7 illustrates an example of raw content data and a content feature vector, according to various embodiments.

Similarly, other types of features may be encoded into other feature vectors. For example, FIG. 7 illustrates an example of raw content features stored in a database of an external data source, and an example of a content feature vector. The database table 700 identifies various content items (such as advertisements Ad1, Ad2, Ad3, etc.) and, for each of the content items, various content features such as Ad Campaign ID, Ad keywords, Ad creator industry, Ad targeting criteria, Ad cost information, and so on. As described above, a content source module may access content feature vector encoding rules in the configuration file that state that, for example, a particular member feature F located at storage location L of the external data source S is to be inserted into position X of a member feature vector M. More specifically, with reference to FIG. 7, the content feature vector encoding rules may state that, for example, a content feature of Ad format is to be stored a position X1 of the content feature vector, a content feature of Ad keywords is to be stored a position X2 of the content feature vector, and so on. Thus, the resulting content feature vector includes various content features associated with a particular content item. In a similar manner, other types of features (e.g., context features, impression features) may be encoded into other feature vectors (e.g., context feature vector, impression feature vector). With reference to the configuration file 300 illustrated in FIG. 3, the output information (e.g., 311c) for each of the source modules may identify a storage location where the feature vectors are to be stored.

Referring back to the method 400 in FIG. 4, in operation 403, the assembler module 204 assembles one or more of the feature vectors output by the various source modules. For example, with reference to FIG. 5, the feature vectors output from source modules 202-1, 202-2, and 202-3 may all be passed to the assembler module 204, which may then combined the feature vectors to generate the assembled feature vector 205. The assembled feature vector 205 may include various blocks that correspond to each of the aforementioned feature vectors output by the source modules 202-1, 202-2, and 202-3.

The assembler module 204 may assemble the feature vectors into the assembled feature vector based on user-specified assembly rules included in the configuration file. With reference to the exemplary configuration file 300 illustrated in FIG. 3, the assembler information 330 includes information 331 for an assembler module. The information 331 includes input information 331a describing the various feature vectors that are to be accessed by the assembler module 204 and their storage locations, operation information 331b describing how the input feature vectors are to be assembled to generate the assembled feature vector, and output information 331c describing where the assembled feature vector is to be stored. For example, the input information 331a may state that the assembler module 204 shall access a member feature vector output by a member source module, a content feature vector output by a content source module, and a context feature vector output by a context source module. Further, the operation information 330b may include instructions stating that the member feature vector output by the member source module should be stored in a first block (Block 1) of the assembled feature vector, the content feature vector output by the content source module should be stored in a second block (Block 2) of the assembled feature vector, and the context feature vector output by the context source module should be stored in a third block (Block 3) of the assembled feature vector, and so on.

Referring back to the method 400 and FIG. 4, in operation 404, the prediction module 206 performs a prediction modeling process based on the assembled feature vector and a prediction model to predict a likelihood of the particular member performing a particular user action on the particular content item. For example, the response prediction system 200 is configured to predict the likelihood (e.g., the probability) that a particular member will perform a particular user action (e.g. click or not click) on a particular content item (e.g., and advertisement displayed on a webpage) in a given context (e.g., time, date, etc.).

The prediction module may use any one of various known prediction modeling techniques to perform the prediction modelling process. For example, according to various exemplary embodiments, the prediction module may perform the prediction modeling process based on a statistics-based machine learning model such as a logistic regression model.

As understood by those skilled in the art, logistic regression is an example of a statistics-based machine learning technique that uses a logistic function. The logistic function is based on a variable, referred to as a logit. The logit is defined in terms of a set of regression coefficients of corresponding independent predictor variables. Logistic regression can be used to predict the probability of occurrence of an event given a set of independent/predictor variables. A highly simplified example machine learning model using logistic regression may be $\ln[p/(1-p)]=a+BX+e$, or $[p/(1-p)]=\exp(a+BX+e)$, where ln is the natural logarithm, $\log_{exp}$, where $\exp=2.71828\ldots$, p is the probability that the event Y occurs, $p(Y=1)$, $p/(1-p)$ is the "odds ratio", $\ln[p/(1-p)]$ is the log odds ratio, or "logit", a is the coefficient on the constant term, B is the regression coefficient(s) on the independent/predictor variable(s), X is the independent/predictor variable(s), and e is the error term.

The independent/predictor variables of the logistic regression model are the attributes represented by the assembled feature vectors described throughout. The regression coefficients may be estimated using maximum likelihood or learned through a supervised learning technique from data collected in logs or calculated from log data, as described in more detail below. Accordingly, once the appropriate regression coefficients (e.g., B) are determined, the features included in the assembled feature vector may be plugged in to the logistic regression model in order to predict the probability that the event Y occurs (where the event Y may be, for example, whether the particular member clicks on the particular content item in the particular context). In other words, provided an assembled feature vector including various features associated with a particular member, a particular content item, a particular context, and so on, the assembled feature vector may be applied to a logistic regression model to determine the probability that the particular member will respond to the particular content item in a particular way (e.g., click) given the particular context. Logistic regression is well understood by those skilled in the art, and will not be described in further detail herein, in order to avoid occluding various aspects of this disclosure.

The prediction module may use various other prediction modeling techniques understood by those skilled in the art to predict whether a particular member will click on a particular content item in a particular context. For example, other prediction modeling techniques may include other machine learning models such as a Naïve Bayes model, a support vector machines (SVM) model, a decision trees model, and a neural network model, all of which are understood by those skilled in the art.

According to various exemplary embodiments, the response prediction system and associated user-supplied configuration file may be used for the purposes of both off-line training (for generating, training, and refining a prediction model) and online inferences (for predicting whether a particular member will click on a particular content item given a particular context, based on a prediction model).

For example, if the prediction module 206 is utilizing a logistic regression model (as described above), then the regression coefficients of the logistic regression model may be learned through a supervised learning technique from data collected in logs or calculated from log data. Accordingly, in one embodiment, the response prediction system 200 and configuration file may operate in an off-line training mode by assembling log data into assembled feature vectors. For example, whenever a member of a social network service performs a particular user action on a particular content item in a given context, various information describing aspects of this interaction (e.g., information describing the member, information describing the content item, information describing the particular context, etc.) may be stored as entries in an interaction log. Over time, the log data may include millions or even billions of entries, representing interactions between different members and different content items in different contexts. Accordingly, the response prediction system may access, for example, all the log entries in the past 30 days where various members performed various user actions (e.g., a click or a non-click) on various content items, and the response prediction system may convert each of these log entries into an assembled feature vector, based on the various embodiments described herein. For the purposes of training the system, the system generally needs both examples of where users performed an action (e.g., click), as well as examples of where users did not perform the action (e.g., non-click). The assembled feature vectors may then be passed to the prediction module, in order to refine regression coefficients for the logistic regression model. For example, statistical learning based on the Alternating Direction Method of Multipliers technique may be utilized for this task.

Thereafter, once the regression coefficients are determined, the response prediction system 200 may operate to perform online inferences based on the trained model (including the trained model coefficients) on a single assembled feature vector. For example, according to various exemplary embodiments described herein, the response prediction system 200 is configured to predict the likelihood that a particular member will perform a particular user action for various content items, in order to determine which of the various content items should be displayed to the particular member in the particular context. For example, suppose a particular member John Smith is attempting to access a webpage in a particular context (e.g., time, date, geo-location information, etc.). The response prediction system 200 may predict the likelihood that the particular member John Smith will click on various content items, such as content item Ad1, Ad2, Ad3, etc., given the particular context. Thereafter, the response prediction system 200 may rank the content items Ad1, Ad2, Ad3, etc., based on how likely it is that the user will perform the user action (e.g., click) on each of the content items given the particular context. For example, if the likelihood that the member will click on Ad1 and Ad3 is low, but the likelihood that the member will click on Ad2 is high, then content item Ad2 may be ranked higher than Ad1 and Ad3. Accordingly, the response prediction system 200 may determine that Ad2 should be displayed to the member instead of Ad1 or Ad3, since the prediction module 206 has determined that the member is more likely to click on Ad2 than Ad1 or Ad3. A similar operation may take place for choosing content to include in a content feed, based on predicting the content items that the user is most likely to like, share, follow, comment on, etc. Accordingly, this online inference process may be performed whenever the member is accessing a webpage and a determination is to be made as to what content should be displayed on the webpage.

Figure 8:
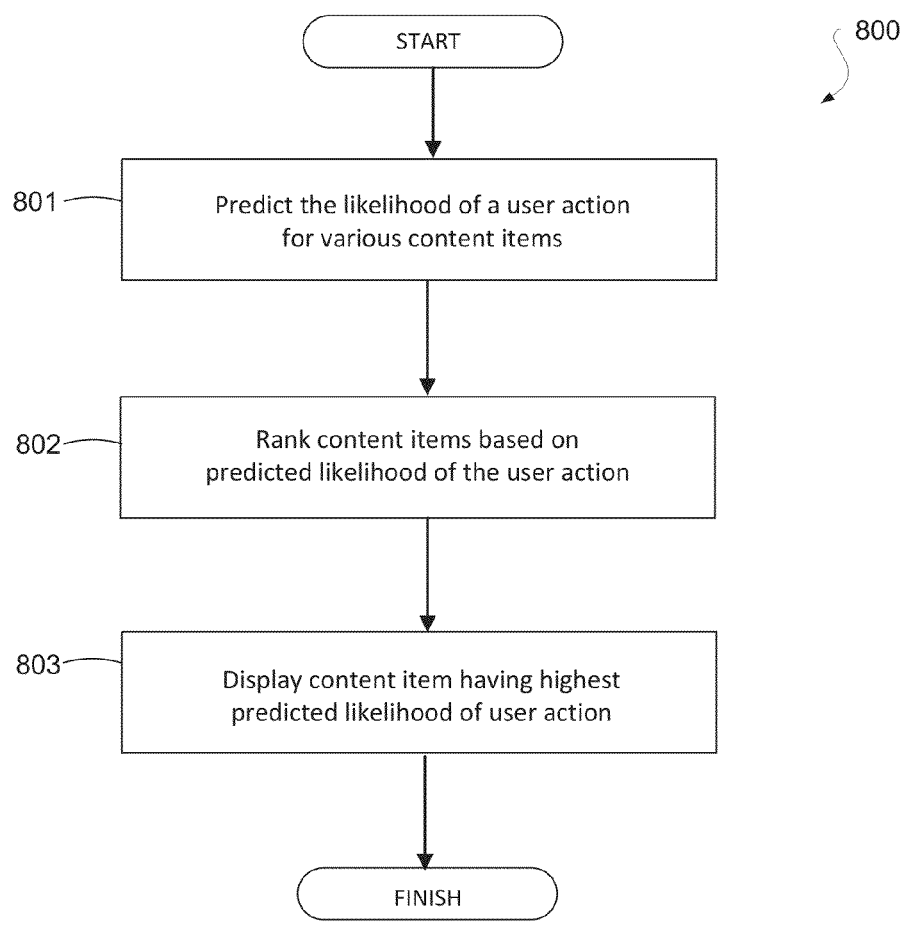
FIG. 8 is a flowchart illustrating an example method, according to various embodiments.

FIG. 8 is a flowchart illustrating an example method 800, consistent with various embodiments described above. The method 800 may be performed at least in part by, for example, the response prediction system 200 illustrated in FIG. 2 (or an apparatus having similar modules). In operation 801, the prediction module 206 predicts the likelihood that a particular member will perform a particular user action (e.g. a user click) for various content items in a particular context. In operation 802, the prediction module 206 ranks the various content items based on the predicted likelihood of the user action (e.g., a user click) on each of the content items. For example, the prediction module 206 may highly rank the content item associated with the highest predicted likelihood of a user click. In operation 803, the prediction module 206 displays the highest ranked content item to the particular member.

In some embodiments, the content item may be an advertisement, offer, promotion, coupon, special, deal, etc., for display on a webpage or in a notification (e.g., text message or an e-mail). In such case, the user action may be a click response, a non-click response, a hover response (e.g., the user causes a mouse cursor to hover over the content item for a predetermined period of time), and a conversion response (e.g., the user selects the advertisement and completes a transaction based on the advertisement).

In some embodiments, the content item may be a piece of content included in a content feed, status feed, activity feed, network feed, network update stream (NUS), and so on. For example, the content item may be an advertisement, an article, a blog post, and so on. In such case, the user action may be a like response (e.g., the member likes the item), a comment response (e.g., the member comments on the item), a share response (e.g., the member shares the item), a follow response (e.g., the member follows the items), a rating response (e.g., the member rates the content item, based on a range of rating options displayed in conjunction with the content item), a click response, a non-click response, a hover response, and so on.

In some embodiments, the content item may be an upgrade offer for upgrading a member account of the particular member. For example, a homepage of a social network service such as LinkedIn® may display an "upgrade" user interface element (e.g., button) that when selected by the user, displays various upgrade offers that are customized for the user, where each of these upgrade offers may be treated as a "content item" as described in this disclosure. In such case, the user action on the content item may be a click response, a non-click response, a hover response, and a conversion response (e.g., the user selects the upgrade offer and completes a transaction based on the upgrade offer).

In some embodiments, the content item may be a landing webpage for display after a user has taken some action on a prior webpage. For example, if the user is presented with an "Add Connection" webpage of a social network service (e.g., LinkedIn®), the user may have the option of adding a connection on the social network service. If the user proceeds by clicking on an "Add Connection" button, then the user may be presented with any one of various landing pages, such as the profile page of the user, the profile page of the connection that was just added, a homepage of the social network service, and so on. Thus, each of these landing pages may be considered as a "content item" as described throughout this disclosure. In such case, the user action on the landing page may be a response to each landing webpage. For example, if the landing page is a member profile page of the user, the user action may be a click on a list of connections, a click on an advertisement, a click on an upgrade offer, a click on a webpage feature displaying other connections that the user may know, and so on. As another example, if the landing page is a homepage of the social network service, the user action may be a click on an item included in an activity feed, a click on an advertisement, a click on an upgrade offer, a click on a webpage feature displaying other connections that the user may know and so on. Thus, the embodiments of this disclosure may be used to select a landing page to present to a user, based on the likelihood that the user will perform some user action on the selected landed page.

Figure 9:
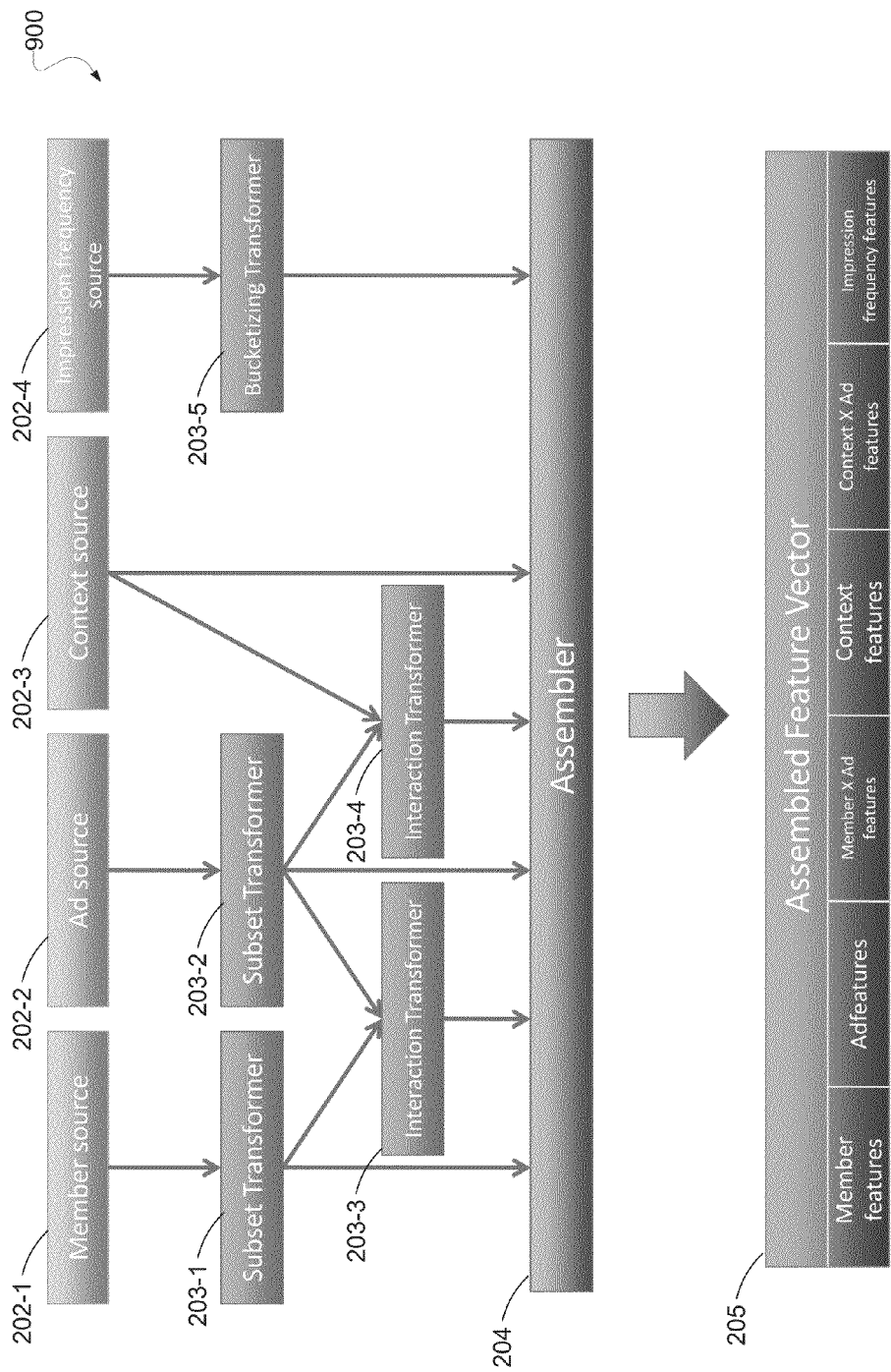
FIG. 9 illustrates a schematic diagram of an exemplary data flow in a response prediction system, according to various embodiments.
Figure 10:
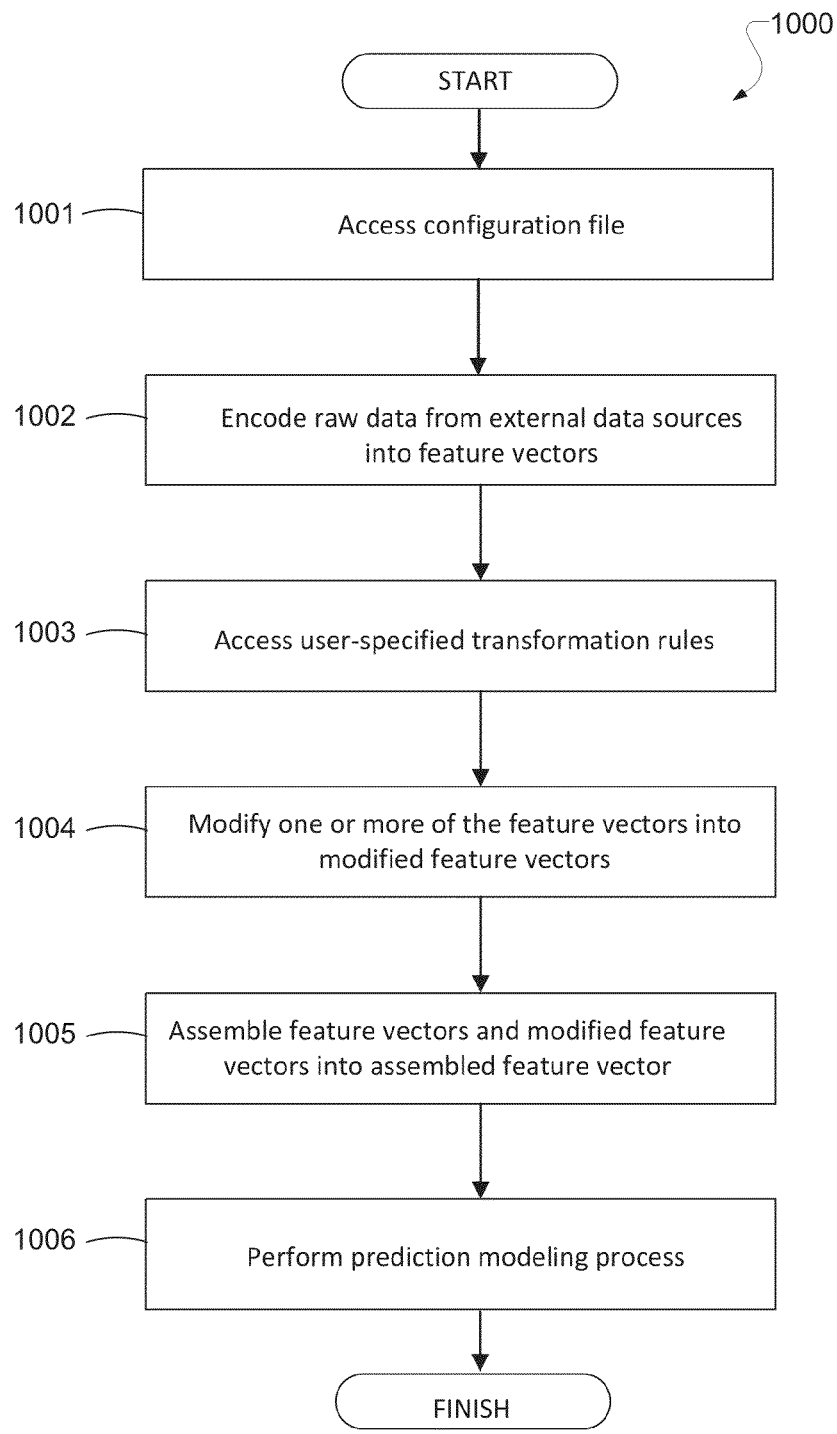
FIG. 10 is a flowchart illustrating an example method, according to various embodiments.

Turning now to FIGS. 9 and 10, the response prediction system 200 may include one or more transformation modules 203 (also referred to as "transformers" throughout) according to various exemplary embodiments. The transformation modules 203 are configured to perform various types of modifications on the feature vectors output by the source modules 202, and to pass these modified feature vectors to either other transformation modules 203, or to the assembler module 204. For example, FIG. 9 illustrates a schematic diagram 900 illustrating an exemplary data flow in the response prediction system 200. As illustrated in FIG. 9, the response prediction system 200 includes various source modules 202, including a member source module 202-1, a content source module 202-2, a context source module 202-3, and an impression frequency source module 202-4. Moreover, the response prediction system 200 includes various transformation modules 203, including subset transformation modules 203-1 and 203-2, interaction transformation modules 203-3 and 203-4, and "bucketizing" transformation module 203-5. According to various exemplary embodiments, the transformation modules are modular and stackable, and the outputs of transformation modules 204 may be passed to other transformation modules 204 for further transformation.

According to various exemplary embodiments, subset transformation modules are configured to reduce a number of features included in a feature vector output by another module (e.g., a source module and/or a transformation module). For example, the subset transformation module 203-1 is configured to reduce the number of features in a member feature vector output by member source module 202-1. As another example, the subset transformation module 203-2 is configured to reduce the number of features included in a content feature vector output by content source module 202-2. This may be advantageous because a feature vector output by a source module may include a large number of features, some of which may be deemed unnecessary or uninteresting for the purposes of prediction modeling. Thus, the subset transformer modules may permit unnecessary or uninteresting features to be removed from the prediction model, thereby also reducing the space and time needed to train and/or run the prediction model.

According to various exemplary embodiments, interaction transformation modules are configured to combine feature vectors, by calculating the cross-product of two or more feature vectors output by two or more other modules (e.g., source modules and/or transformation modules). For example, the interaction transformation module 203-3 is configured to calculate a cross-product of the modified feature vectors output by subset transformation modules 203-1 and 203-2. As another example, the interaction transformation module 203-4 is configured to calculate a cross-product of the modified feature vector output by the subset transformation module 203-2 and the context feature vector output by the context source module 202-3. In some embodiments, after an interaction transformation module calculates a cross-product of multiple feature vectors, the subset transformation module may extract a subset of the cross-product. This may be advantageous because cross-products of feature vectors may result in undesirably large feature vectors.

In some embodiments, a bucketizing transformation module (also referred to herein as a "numerical feature binning transformation module") is configured to transform a real-valued numerical feature in a feature vector into a set of binary-valued numerical features. For example, if a feature (e.g., age) in a feature vector is represented as a real-valued numerical feature (e.g., 49), the numerical feature binning transformation module may convert this single value of 49 to a set of binary values (e.g., where 0 represents false and 1 represents true) associated with a set of features, such as Age 0-17=0, Age 18-25=0, Age 26-49=1, Age 50-100=0).

Accordingly, the numerical feature binning transformation module 203-5 illustrated in FIG. 9 may be configured to convert a real-valued numerical feature in the impression feature vector output by the impression source module 202-4 into a set of binary-valued numerical features. The response prediction system 200 may include other types of transformers configured to modify or transform feature vectors in various other ways. For example, other transformation modules may apply functions to feature vectors, expand feature vectors, etc.

Like the source modules 202, the operation of the transformation modules 203 is completely customizable and configurable via a configuration file that is accessed by each of the transformation modules 203. With reference to the exemplary configuration file 300 illustrated in FIG. 3, the transformer information 320 includes transformer information 321 for a first transformation module ("Transformer 1"), where the transformer information 321 includes input information 321a describing inputs to the transformation module, operation information 321b describing the operations to be performed by the transformation module on the inputs, and output information 321c describing the format and content of the output of the transformation module and where the output is to be stored. Similarly, the transformer information 320 also includes information associated with a second transformer module ("Transformer 2") and information associated with a third transformer module ("Transformer 3").

Accordingly, the configuration file may include transformation rules governing the operations of subset transformation modules, interaction transformation modules, numerical feature binning transformation modules, and so on. For example, the configuration file may include transformation rules (e.g., a series of instructions) configured to cause a subset transformer to receive input feature vector I from module M, and extract a subset of the input feature vector I by removing features XA, XB, and XC. As another example, the configuration file may include transformation rules (e.g., a series of instructions) configured to cause an interaction transformer to receive input feature vector I1 from module M1 and input feature vector I2 from module M2, perform a cross-product P of input feature vectors I1 and I2, and extract a subset of the first n features of the cross-product P. As another example, the configuration file may include transformation rules (e.g., a series of instructions) configured to cause a numerical feature binning transformation module to receive input feature vector I from module M, convert real-valued numerical feature F1 included in input feature vector I into a binary-valued numerical features B1, B2, B3, etc., and replace numerical feature F1 with numerical features B1, B2, B3 in the input feature vector I.

Various feature vectors output from the transformation modules may be passed to the assembler module 204, and the assembler module 204 may generate the assembled feature vector by assembling the various feature vectors received from source modules and/or transformation modules. For example, as illustrated in FIG. 9, the assembled feature vector 205 assembled by the assembler module 204 includes member features output from the subset transformer 203-1, Ad/content features output from the subset transformer 203-2, member x Ad/content features output by the interaction transformer 203-3, context features output by the context source module 202-3, context x Ad/content features output by the interaction transformer 203-4, and impression frequency features output by the bucketizing transformer 203-5. As described in various embodiments above, the configuration file may include assembly rules governing the operation of the assembler module 204. Thus, the assembly rules may specify outputs of source modules and/or transformation modules that are to be assembled in order to generate the assembled feature vector.

FIG. 10 is a flowchart illustrating an example method 1000, consistent with various embodiments described above. The method 1000 may be performed at least in part by, for example, the response prediction system 200 illustrated in FIG. 2 (or an apparatus having similar modules). Operations 1001 and 1002 are similar to operations 401 and 402 to the method 400 illustrated in FIG. 4. In operation 1001, the source modules 202 access a configuration file that identifies raw data accessible via external data sources. In operation 1002, the source modules 202 encode the raw data from the external data sources into feature vectors, based on raw data encoding rules included in the configuration file. In operation 1003, the transformation modules 203 access user-specified transformation rules included in the configuration file. In operation 1004, the transformation modules 203 modify one or more of the feature vectors into modified feature vectors, based on the user-specified transformation rules. In operation 1005, the assembler module 204 assembles one or more of the feature vectors into an assembled feature vector, based on user-specified assembly rules included in the configuration file. In operation 1006, the prediction module 206 performs a prediction modeling process based on the assembled feature vector and a prediction model to predict a likelihood of the particular member performing a particular user action on the particular content item.

According to various exemplary embodiments, the assembler module 204 is configured to detect that a feature vector required for assembly into the assembled feature vector is not available (where such feature vectors may be referred to as "constituent feature vectors"). For example, a feature vector may be unavailable because the underlying raw feature data from an external data source is not available or ready when requested. In various embodiments, the assembler module 204 may handle the unavailability of the missing constituent feature vector in various ways, based on instructions included in the configuration file.

In some embodiments, the configuration file may specify importance values associated with the each of the constituent feature vectors. The importance value may be, for example, a number in a numerical range, such as a number in the range 1-10 or 1-100. The importance values may indicate the importance of each of the constituent feature vectors, and the assembler module 204 may access these importance values during the process of assembling the final assembled feature vector. In some embodiments, low importance values may indicate that a feature vector is not important enough to wait for and may be ignored when the assembler module 204 generates the assembled feature vector. On the other hand, in some embodiments, high importance values may indicate that a feature vector is important enough to wait for and should not be ignored when the assembler module 204 generates the assembled feature vector. For example, if a user determines that, for the purposes of prediction modeling, a member feature vector representing various member features is more important than an impression feature vector representing various impression features, the user may adjust the configuration file to reflect a high importance value for the member feature vector and a low importance value for the impression feature vector. Accordingly, if the member feature vector is not available, the assembler module 204 may wait for the member feature vector to become available so that it can be assembled into the final assembled feature vector. On the other hand, if the impression feature is unavailable, the assembler module 204 may proceed to generate the assembled feature vector, by inserting a substitute value for the missing impression feature vector.

With reference to the exemplary configuration file 300 illustrated in FIG. 3, the assembler information 331 includes importance values 331$d$ and substitute values 331$e$. Thus, in some embodiments, the configuration file 300 may specify a low importance value 331$d$ for a particular feature vector, a substitute value 331$e$ for the feature vector, and an instruction (in operation information 331$b$) that if the constituent feature vector is not available, the substitute value 331$e$ may be inserted into the assembled feature vector in place of the missing constituent feature vector. The aforementioned substitute value may correspond to a null value, a fixed value, a random value, an estimated value defined by distribution (e.g., a sample drawn from a distribution), etc. On the other hand, in some embodiments, the configuration file 300 may specify that a particular constituent feature vector has a high importance value 331$d$, and may include an instruction (in operation information 331$b$) that the assembler module 204 should wait for constituent feature vectors having high importance values to be available before generating the assembled feature vector.

Instead of, or in addition to, importance values 331$d$, the configuration file 300 may include user-specified wait periods 331$f$ associated with each of the constituent feature vectors, as well as the user-specified substitute values 331$e$ associated with the each of the constituent feature vectors. Accordingly, if the assembler module 204 determines that a constituent feature vector is not available by the corresponding wait period 331$f$, the assembler module 204 may insert the corresponding substitute value 331$e$ associated with this constituent feature vector into the appropriate block of the assembled feature vector. In this embodiment, feature vectors that are important may be associated with longer wait periods, whereas feature vectors that are less important may be associated with shorter wait periods. The aforementioned wait periods may be measured from the time a request for a constituent feature vector is transmitted to a source module or transformation module, or the time a request for raw feature data is transmitted from a source module to an external data source, or in relation to when the other constituent feature vectors are received (e.g., if all of the other constituent vectors have been received, the wait period may be measured from when the last constituent vector was received), and so on.

Figure 11:
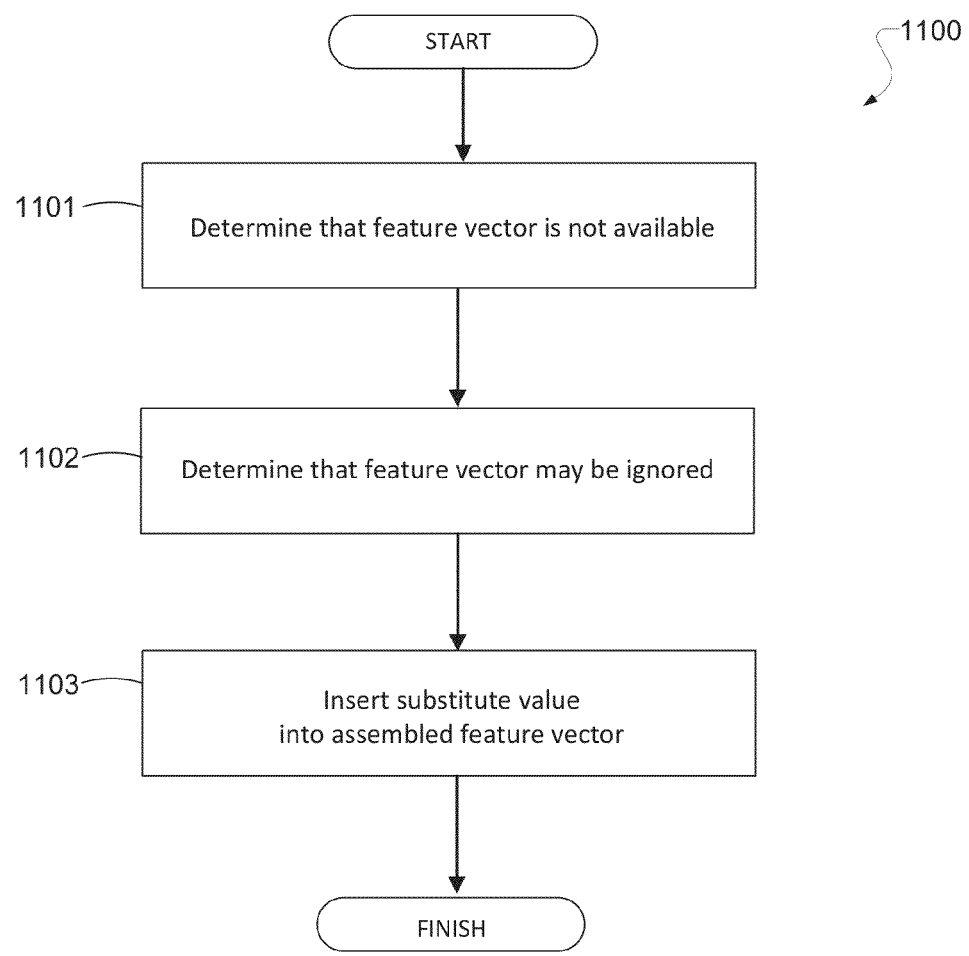
FIG. 11 is a flowchart illustrating an example method, according to various embodiments.

FIG. 11 is a flowchart illustrating an example method 1100, consistent with various embodiments described above. The method 1100 may be performed at least in part by, for example, the response prediction system 200 illustrated in FIG. 2 (or an apparatus having similar modules). The method 1100 may be performed in conjunction with method 400 illustrated in FIG. 4 or method 1000 illustrated in FIG. 10. In operation 1101, the assembler module 204 determines that a particular one of the feature vectors is not available from a particular one of the source modules. In operation 1102, the assembler module 204 determines that the particular feature vector may be ignored based on a user-specified importance value associated with the particular feature vector. The configuration file 300 may identify the user-specified importance value. Alternatively, in operation 1102, the assembler module 204 determines that the particular feature vector has been unavailable for greater than a user-specified wait period associated with the particular feature vector. The configuration file 300 may identify the user-specified wait periods. In operation 1103, the assembler module 204 inserts a user-specified substitute value associated with the particular feature vector into a portion of the assembled feature vector associated with the particular feature vector. The configuration file 300 may identify the user-specified substitute value.

According to various exemplary embodiments, the source modules and/or assembly modules may be configured to encode vectors sparsely. For example, if a given member does not have a given feature, then the corresponding position of the feature vector will be empty. Mathematically, this may be represented in some embodiments by storing a zero "0" element at that position. However, in other embodiments, the vectors may be encoded sparsely. For example, the source modules and/or assembly modules may record only the position and value of the non-zero positions rather than having a fixed size vector that includes both the zero and non-zero values. Accordingly, space is not consumed by zero value elements of the vector. Since the feature vectors may have hundreds to thousands of possible positions in some embodiments, but a given instance might only have dozens of non-zero positions, considerable space savings are possible by recording only the position and value of the non-zero positions, rather than having a fixed size vector that includes both the zero and non-zero values.

The response prediction system 200 of this disclosure may provide significant advantages, in that the operation of the response prediction system 200 is configuration driven (through the user supplied configuration file), rather than code driven. Accordingly, the complexity of the response prediction system 200 is decomposed into fairly independent modules that can be dynamically rearranged and configured by the user. In other words, the arrangement of the sources and the transformers may be dictated by the user through the configuration file, in order to create new arrangements of sources and transformers, where such arrangements may be pushed or shipped out to a running system for performing a prediction modeling process. The modularity and configurability of the response prediction system 200 is especially advantageous because the same configuration file may be used for both online inferences and off-line training based on a machine learning model. In other words, the configuration file may be utilized by the response prediction system 200 to train and generate a prediction model, and the configuration file may then be applied to the response prediction system 200 to run the same model in an online fashion to make predictions Modules, Components and Logic Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 12:
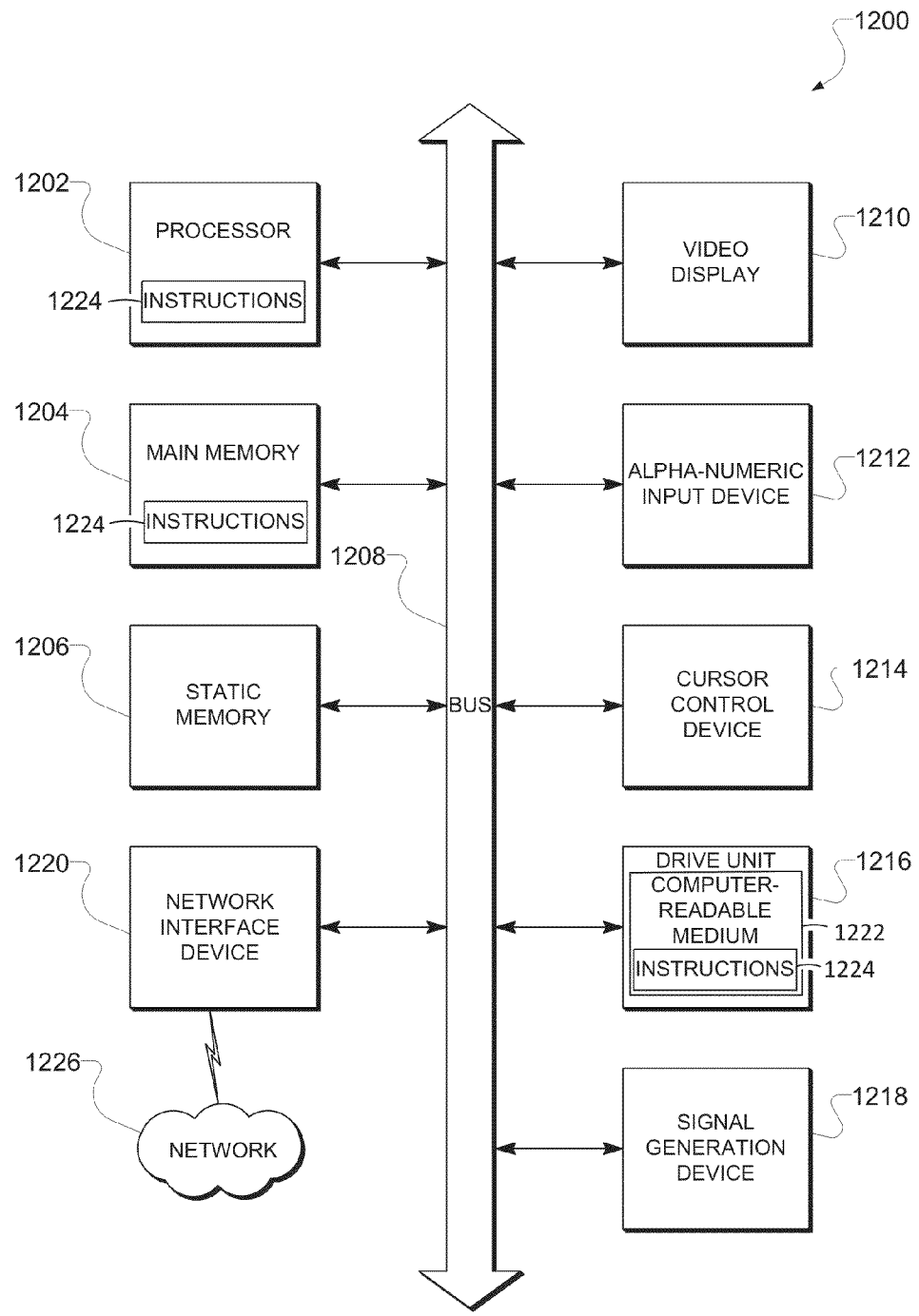
FIG. 12 is a diagrammatic representation of a machine in the example form of a computer system within which a set of instructions, for causing the machine to perform any one or more of the methodologies discussed herein, may be executed.

FIG. 12 is a block diagram of machine in the example form of a computer system 1200 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard or a touch-sensitive display screen), a user interface (UI) navigation device 1214 (e.g., a mouse), a disk drive unit 1216, a signal generation device 1218 (e.g., a speaker) and a network interface device 1220.

Machine-Readable Medium

The disk drive unit 1216 includes a machine-readable medium 1222 on which is stored one or more sets of instructions and data structures (e.g., software) 1224 embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media.

While the machine-readable medium 1222 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
  accessing a user-editable configuration file accessible to an operator of a response prediction system, the user-editable configuration file including
    a user specification of data accessible via external data sources,
    user-specified data encoding rules specifying specific portions of the data to be encoded into specific portions of one or more feature vectors, and
    user-specified assembly rules,
  the data including member data associated with a particular member and content data associated with a particular content item;
  encoding, using a plurality of source modules, the data accessible via the external data sources into the feature vectors, based on the user-specified data encoding rules;
  assembling, using an assembler module, one or more of the feature vectors into an assembled feature vector, based on the user-specified assembly rules included in the user-editable configuration file;
  determining that a particular one of the feature vectors is not available from a particular one of the source modules;
  in response to determining that the particular one of the feature vectors is not available, ignoring the particular feature vector based on a user-specified importance value associated with the particular feature vector;

inserting a user-specified substitute value associated with the particular feature vector into a portion of the assembled feature vector associated with the particular feature vector; and performing, using a prediction module, a prediction modeling process based on the assembled feature vector and a prediction model, to predict a likelihood of the particular member performing a particular user action on the particular content item.

2. The method of claim 1, wherein the plurality of source modules includes a member source module configured to encode the member data into a member feature vector of the feature vectors, wherein the member data includes at least one of gender, age, location, industry, education, current job, experience, skills, and connections.

3. The method of claim 1, wherein the plurality of source modules includes a content source module configured to encode the content data into a content feature vector of the feature vectors, wherein the content data includes at least one of content format, content category, content keywords, content image, content targeting criteria, and content cost information.

4. The method of claim 1, wherein the plurality of source modules includes a context source module configured to encode context data into a context feature vector of the feature vectors, wherein the context data includes at least one of time, date, hour of day, day of week, hour of week, internet protocol (IP) address, user geo-location information, content item page position information, content item host page information, and content item rendering information.

5. The method of claim 1, wherein the plurality of source modules includes an impression frequency source module configured to encode impression frequency data into an impression frequency feature vector of the feature vectors, wherein the impression frequency data identifies a number of impressions of the particular content item by the particular member.

6. The method of claim 1, further comprising:

in response to determining that the particular one of the feature vectors is not available, determining a wait period based on the importance value;

waiting, for the determined wait period, for the feature vector to become available;

determining that the particular one of the feature vectors is not available by the determined wait period; and inserting the user-specified substitute value associated with the particular feature vector into the portion of the assemble feature vector associated with the particular feature vector.

7. The method of claim 1, wherein the user-editable configuration file identifies the user-specified importance value and the user-specified substitute value associated with the particular feature vector.

8. The method of claim 1, further comprising:

accessing user-specified transformation rules included in the user-editable configuration file; and modifying, using one or more transformation modules, one or more of the feature vectors into modified feature vectors, based on the user-specified transformation rules, wherein the assembler module assembles at least one of the modified feature vectors into the assembled feature vector.

9. The method of claim 8, wherein the one or more transformation modules include a subset transformation module configured to reduce a number of features included in a feature vector output by one of the source modules.

10. The method of claim 8, wherein the one or more transformation modules include an interaction transformation module configured to calculate a cross-product of two feature vectors output by two of the source modules.

11. The method of claim 8, wherein the one or more transformation modules include a numerical feature binning transformation module configured to transform a real-valued numerical feature in a feature vector output by one of the source modules into a set of binary-valued numerical features.

12. The method of claim 8, wherein a modified feature vector output from a first transformation module is input to a second transformation module, and wherein the second transformation module outputs a further modified feature vector.

13. The method of claim 1, wherein the content item is an advertisement, and wherein the user action is any one of a click response, a non-click response, a hover response, and a conversion response.

14. The method of claim 1, wherein the content item is included in a content feed, and wherein the user action is any one of a like response, a comment response, a share response, a rating response, a click response, a non-click response, and a hover response.

15. The method of claim 1, wherein the content item is an upgrade offer for upgrading a member account of the particular member, and wherein the user action is any one of a click response, a non-click response, a hover response, and a conversion response.

16. The method of claim 1, wherein the content item is a landing webpage for display after a previous webpage, and wherein the user action is one of a plurality of responses specific to the landing webpage.

17. The method of claim 1, wherein the prediction model is any one of a logistic regression model, a Naïve Bayes model, a support vector machines (SVM) model, a decision trees model, and a neural network model.

18. The method of claim 1, wherein the prediction module performs a training operation to refine coefficients of a logistic regression model, based on training set data comprising the assembled feature vector.

19. A system comprising:

a machine including a memory and at least one processor;

a plurality of source modules, executable by the machine, to:

access a user-editable configuration file accessible to an operator of a response prediction system, the user-editable configuration file including a user specification of data accessible via external data sources, user-specified data encoding rules specifying specific portions of the data to be encoded into specific portions of one or more feature vectors, and user-specified assembly rules, the data including member data associated with a particular member and content data associated with a particular content item;

encode the data accessible via the external data sources into the feature vectors, based on the user-specified data encoding rules;

an assembler module to:

assemble one or more of the feature vectors into an assembled feature vector, based on the user-specified assembly rules included in the user-editable configuration file;

determine that a particular one of the feature vectors is not available from a particular one of the source modules;

in response to determining that the particular one of the feature vectors is not available, ignore the particular feature vector based on a user-specified importance value associated with the particular feature vector; and insert a user-specified substitute value associated with the particular feature vector into a portion of the assembled feature vector associated with the particular feature vector; and a prediction module to perform a prediction modeling process based on the assembled feature vector and a prediction model, to predict a likelihood of the particular member performing a particular user action on the particular content item.

20. A non-transitory machine-readable storage medium having embodied thereon instructions executable by one or more machines to perform operations comprising:

accessing a user-editable configuration file accessible to an operator of a response prediction system, the user-editable configuration file including a user specification of data accessible via external data sources, user-specified data encoding rules specifying specific portions of the data to be encoded into specific portions of one or more feature vectors, and user-specified assembly rules, the data including member data associated with a particular member and content data associated with a particular content item;

encoding, using a plurality of source modules, the data accessible via the external data sources into the feature vectors, based on the user-specified data encoding rules;

assembling, using an assembler module, one or more of the feature vectors into an assembled feature vector, based on the user-specified assembly rules included in the user-editable configuration file;

determining that a particular one of the feature vectors is not available from a particular one of the source modules;

in response to determining that the particular one of the feature vectors is not available, ignoring the particular feature vector based on a user-specified importance value associated with the particular feature vector;

inserting a user-specified substitute value associated with the particular feature vector into a portion of the assembled feature vector associated with the particular feature vector; and performing, using a prediction module, a prediction modeling process based on the assembled feature vector and a prediction model, to predict a likelihood of the particular member performing a particular user action on the particular content item.

* * * * *

UNITED STATES PATENT AND TRADEMARK OFFICE
CERTIFICATE OF CORRECTION

| | | |
|---|---|---|
| PATENT NO. | : 8,930,301 B2 | Page 1 of 1 |
| APPLICATION NO. | : 13/906874 | |
| DATED | : January 6, 2015 | |
| INVENTOR(S) | : Traupman et al. | |

It is certified that error appears in the above-identified patent and that said Letters Patent is hereby corrected as shown below:

On the Title page, item 56, in column 2, under "Other Publications", line 12, delete "Anothe" and insert --Another--, therefor In the Claims In column 22, line 44, in Claim 1, after "including", insert --,--, therefor Signed and Sealed this
Twenty-fourth Day of November, 2015

Michelle K. Lee
*Director of the United States Patent and Trademark Office*